Aug. 16, 1955     S. P. KISH     2,715,280

REPRODUCTION FIXTURE

Filed July 6, 1950     2 Sheets-Sheet 1

INVENTOR.
Steven P. Kish.
BY
Harness, Dickey & Pierce
ATTORNEYS.

Aug. 16, 1955  S. P. KISH  2,715,280
REPRODUCTION FIXTURE
Filed July 6, 1950  2 Sheets-Sheet 2

INVENTOR.
Steven P. Kish.
BY
Harness, Dickey & Pierce
ATTORNEYS.

United States Patent Office 2,715,280
Patented Aug. 16, 1955

2,715,280

REPRODUCTION FIXTURE

Steven P. Kish, Lansing, Mich., assignor to Kish Plastic Products, Inc., Lansing, Mich., a corporation of Michigan Application July 6, 1950, Serial No. 172,356

5 Claims. (Cl. 33—174)

This invention relates to new and useful improvements in reproduction fixtures and to a method of making the same.

In the automobile industry, for example, the production of a new body style involves a number of expensive tooling operations. Usually the first step in these operations is the preparation of a master model of each of the newly designed parts and often a master die model for the part. These master models are valuable and are therefore used only for reference purposes. It is necessary, however, to have tools for various purposes which accurately represent the surfaces shown in the original form on the master model. Thus it is necessary to have die models for use in the machining of the production dies. It is necessary to have checking fixtures for inspecting the mass-produced parts, as well as for checking the production dies. In some cases it may be necessary to have hammer forms to assist in the actual manufacture of the production parts. These and other tools herein referred to as reproduction fixtures are prepared from the master models.

Reproduction fixtures must be made by some method that will not damage or deface the master model. It is generally accepted in the art that the method most suited for this purpose is merely to cast the fixture against the face of the model. The usual procedure has been to fabricate a supporting framework of wood or metal, then support the framework in slight spaced relation above the surface of the model, and then cast a hardenable plastic material in the space between the model and the framework in such a manner that it accurately reproduces the surface of the model and simultaneously bonds to the framework. Different materials such as Wood's metal and various organic plastic materials have been used as the casting media.

It is evident that the value of reproduction fixtures is directly related to their wear resistance and to their dimensional stability. It is also desirable to have the fixtures as light in weight as is consistent with the retention of satisfactory properties of wear resistance and dimensional stability inasmuch as the handling thereof is at best a very awkward process.

Wooden frameworks can be fabricated more easily and quickly than metal frameworks and they can be more readily shaped to the general form of the part to be reproduced. The framework is composed of individual, longitudinal and transverse members assembled substantially in the form of an egg crate, and the universal practice has been to fasten these members solidly together by gluing or nailing, or both, before the casting operation. Fixtures of this type have had certain recognized disadvantages, the most objectionable being a tendency to warp or twist out of shape particularly if exposed to excessive dampness or other unfavorable conditions.

I have now discovered a way to prevent or as least markedly reduce the heretofore universal tendency of reproduction fixtures having wooden supporting frameworks to warp, buckle or twist without sacrificing in any respect the desirable properties of these fixtures.

To this end, attention is directed to the accompanying drawings which show a reproduction fixture constructed according to the present invention and wherein.

Figure 1:
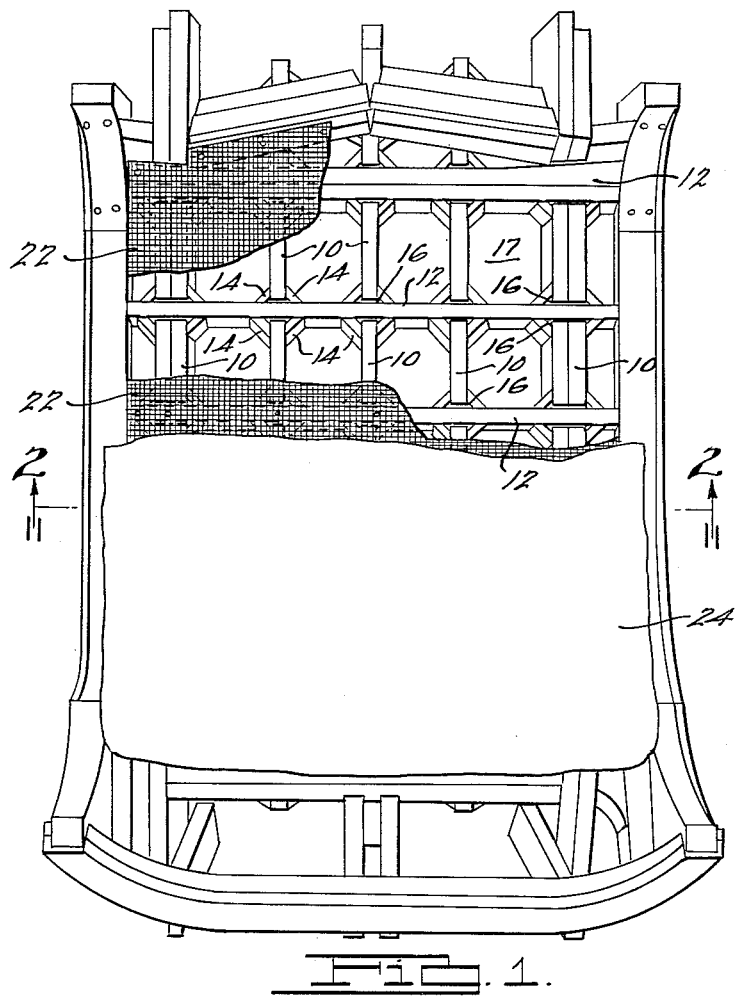
Fig. 1 is a bottom plan view of a partly formed reproduction fixture embodying the invention, parts thereof being broken away and shown in section for clearness of illustration.
Figure 2:
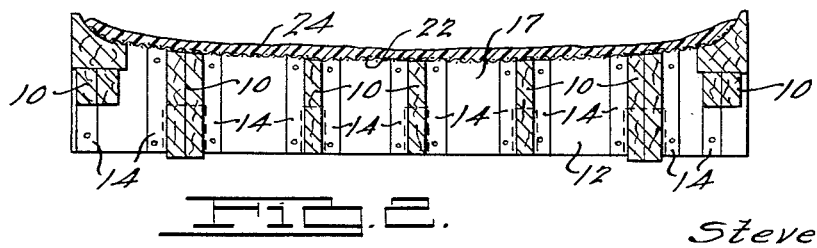
Fig. 2 is a transverse sectional view taken on the line 2—2 of Fig. 1.
Figure 3:
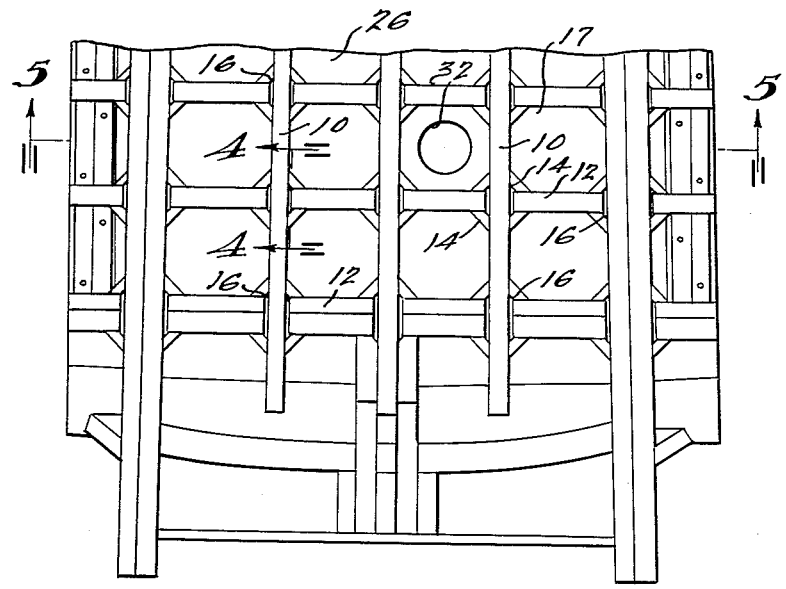
Fig. 3 is a fragmentary top plan view of the partly finished fixture shown in Fig. 1.
Figure 4:
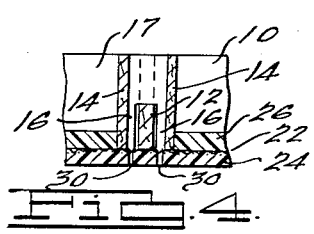
Fig. 4 is a fragmentary longitudinal sectional view taken on the line 4—4 of Fig. 3.
Figure 5:
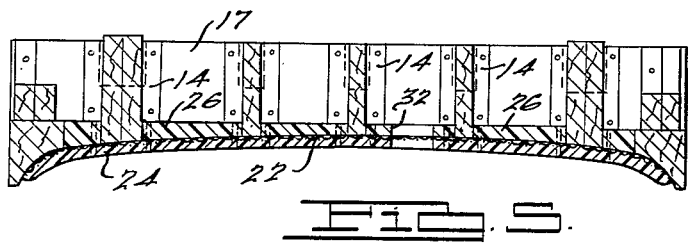
Fig. 5 is a transverse sectional view taken on the line 5—5 of Fig. 3.

According to this invention a lattice-type wooden framework is made up in which the individual members of the frame are loosely joined to eliminate internal stresses which cause warpage. As suggested, it has heretofore been the universal practice to clamp the members of the frame tightly together when it is formed, and I have discovered that this creates internal stresses which result in warpage of the finished product. Actual tests under service conditions have shown that the life of the fixture is extended very considerably merely by making the joints of the framework loose to eliminate stresses therein before the casting is made so that stresses cannot be transmitted from one member to the other.

After the frame is formed, a wire mesh preferably is tacked on one side thereof and a thin layer of hardenable plastic material such as a conventional thermosetting organic resin is paddled or otherwise applied to the mesh. After the plastic coating has hardened, the frame is turned over and plastic is poured to a suitable depth in each cell of the frame. Holes are then drilled through the plastic at the intersections of the frame members to provide vents through which air escapes when the finished plastic coating is poured.

The frame thus made is then superposed on the model to be reproduced and the sides between the frame and the model are boxed in. Plastic is then introduced into the space between the frame and the model through a pouring opening previously made in one of the cells. As the plastic fills the space, air escapes through the vent holes previously drilled, and the plastic rises in the holes to form rearward projections which assist in uniting the plastic to the frame. After the plastic has hardened, a strong, essentially rigid fixture is produced. However, in spite of the apparent rigidity of the fixture, I have found that the individual members of the lattice framework which back up or reinforce the fixture can change slightly in dimension when exposed to dampness or other adverse conditions without warping or twisting the cast plastic surface thereof. In other words, in the parlance of the trade, the wood backing can "come and go" without changing the testing surface which must have precise and sustained dimensional stability. To my knowledge, this has never been possible in any fixture employing a lattice-type wooden reinforcing structure.

In the drawings I have shown by way of illustration a fixture which is a female reproduction of an automobile roof panel. It will be readily appreciated of course that the size and shape of the framework will vary depending upon the nature of the fixture and the physical characteristics of the master model or part to which it pertains. Also, the frame may be made differently in different specific instances, depending upon the exigencies of the particular situation.

The frame here shown has generally the form of an "egg crate" or lattice and comprises a plurality of laterally spaced, generally parallel, longitudinal members 10 and similarly spaced transverse members 12. Opposite edges of the longitudinal members 10 and transverse members 12 are mortised or notched and the notches are interfitted so that all of the members are essentially coplanar.

It is understood, of course, that the frame members 10 and 12 are adequately strong and, if necessary or desirable, the frame may be additionally strengthened or reinforced in any manner known to the art. For example, in the fixture here shown, certain of the longitudinal members 10 are of double thickness and the periphery of the frame is especially constructed to assure adequate strength. The specific construction of the peripheral members does not comprise a part of this invention and it therefore need not be described in detail. It is sufficient to state that any construction that might be developed by a journeyman carpenter or model maker can be employed in the general fabrication and shaping of the fixture. The important thing in so far as the instant invention is concerned is that the longitudinal members 10 and transverse members 12 be loosely connected so that stresses which tend to cause warpage or twisting of the frame are not transmitted from one member to the other.

In the construction here shown, the longitudinal members 10 are not connected directly to the transverse members 12 and the interfitting mortises or notches are sufficiently loose so that each member is free to move, warp or twist slightly without appreciably affecting adjacent members. At the intersection of each longitudinal member 10 with each transverse member 12 I provide diagonal braces 14. The ends of the braces 14 are beveled at approximately forty-five degrees and they are nailed or otherwise fastened to the members 10 and 12. It will be observed that this construction provides a small triangular space 16 at each of the adjacent sides of intersecting members 10 and 12, and the braces 14 extend the full width of the main frame members so that the spaces 16 are separated from the main area of the cells 17 defined by the members.

From the foregoing it will be readily apparent that the described construction provides an essentially rigid peripheral structure having an interior "egg crate" or lattice in which the members comprising the same are loosely interconnected. In actual practice, the reinforcing framework should be such, at this stage in its construction, that the individual lattice members are each free to move at least slightly relative to adjacent or intersecting lattice members. The term "loose" as used in the instant specification and claims, particularly as applied to the lattice structure, means that the individual members of the lattice are interconnected or joined together in such a way as to permit substantial relative movement between the individual members of the lattice. When this condition obtains, each lattice member can warp or twist or otherwise move to the extent normally occurring in use without imparting the corresponding warp or twist or movement to other members in the lattice. As thus used, the term "loose" distinguishes a structure of the type referred to above from a structure wherein the individual members of the framework are rigidly and solidly fastened together to produce a stiff, inflexible, unitary structure wherein warpage, twisting, or movement of one member invariably and inevitably stresses other members in the lattice with which it is in contact and thus imparts a warp or twist or movement to such other members. It is essential to avoid a solid, rigid construction. If the desired relationship obtains between the lattice members there are no stresses in the lattice framework when the plastic is cast against the model and on the framework. By making the individual lattice members essentially loose, all the stresses are removed from the framework and the latter is essentially unstressed when the plastic is poured.

As suggested, the frame members are shaped so that the undersurface of the frame corresponds generally to the master model 18. The surface of the model 18 to be reproduced is designated by the numeral 20.

The next step is to fasten a piece of wire screen or mesh 22 on the undersurface of the lattice framework. The mesh preferably is cut roughly to the same size and shape as the frame and then tacked as required to fasten the mesh securely to the frame. Under certain circumstances, as in the case of small fixtures, the wire mesh 22 can be eliminated. In general, however, the mesh is desirable in the combination since it provides a foundation for attaching the plastic layer 24 to the framework.

The plastic material 24 can be any hardenable plastic material conventionally used in the art. However, I prefer to use an organic plastic material such as a phenol formaldehyde or urea-formaldehyde resin. Resins of this type can be mixed to a plastic consistency and then applied over the entire surface of the screen 22 either by pouring or by paddling according to conventional practice. As the plastic is applied to the screen 22 it penetrates the screen openings and bonds securely to the screen and to the subjacent lattice framework. After application of the plastic, it can be hardened by any suitable or known method such as the use of acid in the mix or by heating in an oven. The plastic layer 24 preferably is uniformly thick although some slight changes in the thickness dimension may occur as the plastic hardens.

After the plastic layer 24 has hardened, the partly finished fixture is essentially rigid but the rigidity is due to the plastic and not to the supporting wooden frame. The individual members of the latter still are unstressed and they can expand or contract slightly without appreciably affecting the dimension or form of the plastic layer. The frame is then positioned with the plastic layer 24 on the bottom, and additional plastic material 26 is poured into each of the generally octagonal cells 17. Preferably, the same plastic material is used in the cells 17 as for the underlayer 24. The several plastic layers 26 penetrate the mesh 22 to bond thereto solidly and with the layer 24. The plastic material can be poured to any suitable or desired depth in the cells 17 but an inch or even less of the material in the cells usually is sufficient. Organic plastic materials of the type specifically referred to above unite to form an integral one-piece construction; and, when the plastic material 26 has hardened, there is no appreciable or noticeable joint between the two layers. As in the case of the plastic layer 24, the plastic material 26 can be hardened either by the use of acid in the mix or by heating at a suitable temperature in an oven. The plastic material in cell 17 further strengthens and reinforces the fixture. As previously described, however, the rigidity is due entirely to the plastic material and not to the wooden reinforcing framework.

Holes 30 are then drilled through the mesh 22 and plastic layer 24 at each of the triangular spaces 16. This provides holes or vents 30 at each intersection of a longitudinal member 10 with a transverse member 12. Since the angular braces 14 confine the inner plastic layers 26, the vents 30 are open at both ends. A pouring vent 32 of substantial size is then cut through the superposed plastic layers 24 and 26 in one of the cells 17.

Figure 6:
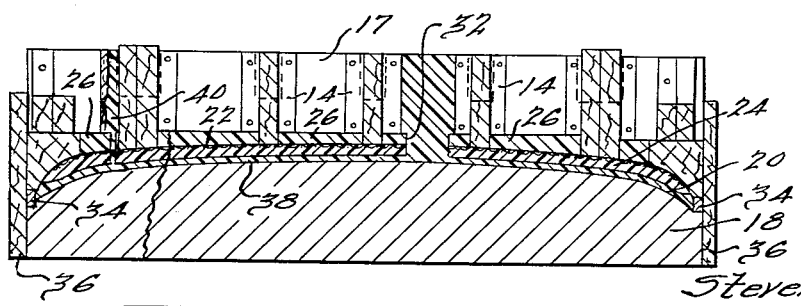
Fig. 6 is a transverse sectional view showing the finished fixture superposed on a master model.

The partly prepared fixture is then placed on the model 18 as shown in Fig. 6 with the plastic layer 24 spaced above the surface 20. If necessary or desirable, small spacers 34 may be interposed between the fixture and the model to hold the undersurface of the fixture suitably spaced from the model surface. The space between the fixture and the model is then boxed in by side-wall members 36 or the like.

Additional plastic material is then poured into the space between the fixture and the model through the opening 32 and as the plastic spreads out and fills the space, air is forced out through the vents 30 so that no air pockets are formed between the plastic layers. When the space has been entirely filled with the plastic, an outer coating 38 is formed on the layer 24, which coating accurately reproduces in minute detail the surface of model 18. Further, plastic material from the coating 38 rises through vents 30 into the triangular spaces 16 to provide rearward extensions 40 which are integral with the coating and hold the plastic material anchored securely to the frame. The final resin coating preferably is poured so that it completely fills the vents 30. The plastic extensions 40 terminate flush with the outer surface of the supporting wooden framework completely filling and sealing the vents 30. This prevents water dampness from penetrating and accumulating in the vents from the back of the fixture and swelling or rotting the wooden frame members. The cells 17 are not completely filled but they are sufficiently large so that water does not tend to accumulate or stand therein during normal handling and use of the fixture. When the plastic layer 38 has been suitably hardened or set, the fixture is removed from the model 18, and the exposed wooden surfaces preferably are coated with a suitable preservative.

The plastic layers 24 and 26, together with the lattice framework, collectively provide a firm foundation which holds the outer plastic coating 38 accurately to the dimensions of the model 18 and which effectively resists internal forces or stresses created when the coating is set or hardened. The base layer 24 conveniently can be shaped at the time it is applied to the lattice framework so that it conforms approximately to the surface of the model 18. In this manner the outer coating 38 is maintained essentially thin, so that stresses created when it sets are not sufficient to warp or twist the preformed structure. As a result an exceedingly accurate reproduction of the surface 20 is obtained.

Even more important than the above, however, is the dimensional stability of the fixture due to the manner of loosely joining the horizontal and transverse members 10 and 12 of the lattice framework. Fixtures constructed as described above maintain true dimensions much longer and show much less tendency to warp or twist out of shape when exposed to dampness or other adverse conditions than prior constructions wherein the members of the supporting wooden framework are fastened solidly or rigidly together. The importance of this discovery is obvious when it is considered that any inaccuracies in dimension which develop in the fixture may be carried through as an error in the production parts if not noticed or it may involve lengthy and costly delays if noticed.

Having thus described the invention, I claim:

1. A reproduction fixture comprising a plurality of individual wooden members joined together in a lattice structure, nonrigid connections between said members permitting substantial relative movement between the individual members and permitting each member to flex and warp to an appreciable and significant extent without twisting and warping other members in the lattice structure, and a layer of hardened cast material contacting and bonded to one side of the lattice having an outer surface accurately shaped to a predetermined form, said cast material being bonded only to the contacted edge portion of the lattice so that most of the lattice members and the means connecting them together extend from the back of and are free of said cast material.

2. A reproduction fixture comprising a plurality of individual wooden members joined together in a lattice structure, nonrigid connections between said members permitting substantial relative movement between the individual members and permitting each member to flex and warp to an appreciable and significant extent without twisting and warping other members in the lattice structure, bonding and reinforcing means fastened to one edge only of the lattice structure, and a layer of hardened cast material on the mentioned side of the lattice enclosing said bonding and reinforcing means and bonded to the contacted edge portions of the lattice members, the front surface of said cast material being accurately shaped to a predetermined form and a major portion of the lattice members extending rearwardly from and free of said cast material.

3. A reproduction fixture comprising a plurality of individual wooden members joined together in a lattice structure, nonrigid connections between said members permitting substantial relative movement between the individual members and permitting each member to flex and warp to an appreciable and significant extent without twisting and warping other members in the lattice structure, bonding and reinforcing wire mesh fastened to one edge only of the lattice structure, and a layer of hardened cast material on the mentioned side of the lattice enclosing said bonding and reinforcing wire mesh and bonded to the contacted edge portions of the lattice members, the front surface of said cast material being accurately shaped to a predetermined form and a major portion of the lattice members extending rearwardly from and free of said cast material.

4. A reproduction fixture comprising a plurality of individual wooden members joined together in a lattice structure, nonrigid connections between said members permitting substantial relative movement between the individual members and permitting each member to flex and warp to an appreciable and significant extent without twisting and warping other members in the lattice structure, and a layer of hardened, thermosetting, organic, plastic material contacting and bonded to one side of the lattice having an outer surface accurately shaped to a predetermined form, said thermosetting, organic, plastic material being bonded only to the contacted edge portion of the lattice so that most of the lattice members and the means connecting them together extend from the back of and are free of said thermosetting, organic, plastic material.

5. The method of making a reproduction fixture comprising forming a wooden lattice framework with the individual lattice members nonrigidly connected so that substantial relative movement can occur between the individual members, supporting the framework in unstressed condition above a surface to be reproduced, casting a hardenable material between the surface to be reproduced and one side of the lattice while the latter is in unstressed condition so that said material accurately reproduces said surface and bonds securely to the mentioned side of the lattice but leaves most of the lattice members extending free and clear of said cast material.

References Cited in the file of this patent

UNITED STATES PATENTS

| 466,147 | Beaumont | Dec. 29, 1891 |
| 713,607 | Coleman | Nov. 18, 1902 |
| 1,846,874 | Kahn | Feb. 23, 1932 |
| 2,202,683 | Baesgen | May 28, 1940 |
| 2,246,332 | Whitely, Jr. | June 17, 1941 |
| 2,256,247 | Groehn | Sept. 16, 1941 |
| 2,315,894 | Crom | Apr. 6, 1943 |
| 2,371,047 | Groehn | Mar. 6, 1945 |
| 2,420,359 | Dasher | May 13, 1947 |
| 2,434,372 | Stewart | Jan. 13, 1948 |
| 2,460,242 | Renaud | Jan. 25, 1949 |
| 2,516,091 | Renaud | July 18, 1950 |